No. 634,276. Patented Oct. 3, 1899.
P. SHAW.
GLASS WORKER'S TOOL.
(Application filed May 10, 1898.)

(No Model.)

WITNESSES:
C. P. Alber
G. E. Cordeau

INVENTOR.
Peter Shaw,
BY Emil F. Gennert
HIS ATTORNEY.

THE NORRIS PETERS CO., PHOTO-LITHO., WASHINGTON, D. C.

UNITED STATES PATENT OFFICE.

PETER SHAW, OF NEW YORK, N. Y.

GLASS-WORKER'S TOOL.

SPECIFICATION forming part of Letters Patent No. 634,276, dated October 3, 1899.

Application filed May 10, 1898. Serial No. 680,266. (No model.)

*To all whom it may concern:*

Be it known that I, PETER SHAW, a subject of Her Majesty the Queen of Great Britain, and a resident of the borough of Brooklyn, city of New York, county of Kings, State of New York, have invented certain new and useful Improvements in Glass-Workers' Tools, of which the following is a specification.

My invention relates to an improvement in tools for glass-workers' use, and relates to the construction of a "snap" for holding hot articles of glassware, more particularly smoke-bells and smoke-shades, the object being to produce a snap which can be quickly operated, will securely hold only the base of the article to be manipulated and prevent the same from turning or slipping within the snap, and at the same time be light and devoid of heavy metal parts, so as to cool quickly, and be so arranged that repairs can be easily made. I accomplish these results in a manner hereinafter described, reference being had to the accompanying drawings, which form part of this specification, in which—

Figure 1:
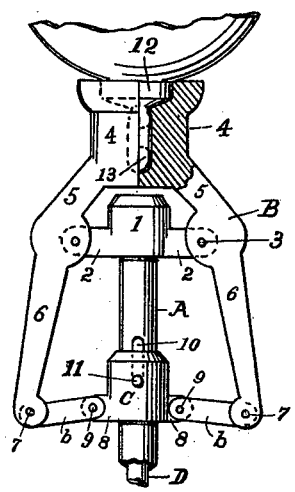
Figure 2:
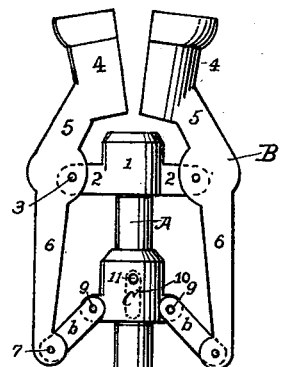
Figure 3:
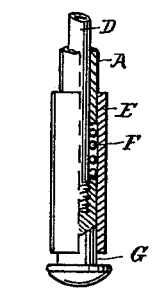
Figure 4:
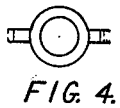
Figure 5:
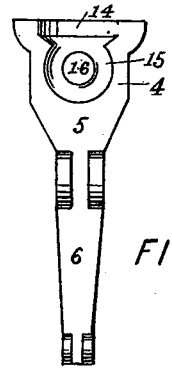

Figure 1 is a side elevation of my improved snap, partly in section, the jaws being closed and holding a smoke-shade by its suspension-ring and base. Fig. 2 is a similar view, the jaws being open. Fig. 3 is an end view of Fig. 1, the smoke-shade being removed. Fig. 4 is an end view of a body; and Fig. 5 is one of the arms and jaws, showing inner face, recesses, and holding-lug.

A is a steel tube of the usual length used in snaps. On one end a body 1, having two flat arms 2, is rigidly mounted. At the outer end the arms are drilled each with a hole for the passage of a screw or pin 3, on which the arms B are fulcrumed. The jaws consist of a jaw proper, 4, short arm 5, and lower arm 6, the arms being internally recessed at the elbow for the reception of arms 2, and being slotted at lower end of arm 6 for the reception of a link *b*. This link is connected with arm by means of a pin or screw 7. The link *b* is connected at its other end with arm 8 of sliding collar C by means of a screw or pin 9. The collar C slides easily over the tube A. The tube is pierced with a slot 10 at the opposite sides of its diameter at a place relatively opposite to where the sliding collar C is to be operated, as shown.

An inner tube D is placed inside of tube A, running almost the entire length. Near the upper end of tube D a hole is drilled for passage of a pin or screw 11. This screw or pin 11 passes also through the collar C and through slots 10, the slot limiting the sliding movement of the collar C and keeping arms 8 on a parallel line with arms 2 of body 1. On the end of the tube A a sleeve E of a larger diameter than tube A is secured. The space thus made between the inner tube D and sleeve E forms a chamber for a spiral spring F, the spring being held in its place by the end of a push-knob G, which is screwed on the end of the inner tube D and projects some distance outside of sleeve E.

Both jaws are finished alike and are so arranged at their faces that they will seize and securely hold only the base 12 of a smoke-shade or any article of glassware provided with a base upon which a ring 13 is mounted, both of which are integral with each other. The jaws when closed and viewed from the end, as will be seen, have a round recess 14 of some depth to correspond with the size of the ring-base 12 which it is intended to hold, this recess communicating with an annular recess 15, which is cut in the side or meeting face of the jaw and at right angles to the recess 14, one-half the depth of thickness of ring 13 being cut into each jaw, thereby forming a central stud 16, so as to enter the glass ring 13 when presented to it. When the jaws are closed upon the ring and base, the body of the bell will be entirely exposed and out of contact with the clamp.

It is not necessary that the recess be of a size to snugly fit the ring on the end of bells or other articles desired to be held, as the same result will be accomplished should the ring be smaller than the cavity. The only requisite is that the studs 16 be of a size to permit their passage through the eye of the bell. There are two of these studs, one on each member of the clamp, and when the same is closed they meet within the eye and hold the article securely, not only from being removed, but also from slipping and rotating during the operation of reheating and finishing. I am aware that molds have been constructed with a lug projecting from the center of a recess for forming an eye in an article; but I am not aware that a snap or holding-tool has been constructed with recesses in the clamping-faces for holding a ring and lugs standing within the recesses and adapted to pass through the eye for the purpose of snugly holding the bell and to prevent any forward movement and yet have the entire body proper of the bell exposed and free from the jaws of the clamp.

Such being the construction, the operation is as follows: When the snap is in its normal condition, the jaws are closed, being held in that way by the spiral spring F. To open the jaws, the tube A is held in one hand and with the other hand the knob G is pushed inward. This movement pushes in the inner tube D, and by means of the pin 11 the body C is also moved forward. This operation, as shown in Fig. 2, draws the lower arms 6 inward by means of the links $b$, and the arms B being fulcrumed at the elbow, the jaws 4 are opened to receive the hot glass article. By releasing the knob G the resiliency of the spring F will draw down the inner tube D and collar C and distend the arms 6, thereby tightly closing the jaws on the work in such a manner as to grasp only the eye and thickened base, so as to leave the body proper free. The snap can now be twisted or twirled around throughout the various operations required to finish the glass blank which the jaws are holding without any danger of the jaws opening or letting go of the article. The snap is preferably made of malleable iron and, as will be seen, is so arranged that in manipulating the glass the working parts are exposed to the air, the rotary motion given to the snap in working the glass tending to keep the arms and bodies cool.

There are no concealed working parts except the spring. Each part is easily removed and replaced in case of its becoming damaged.

What I claim as new, and desire to secure by Letters Patent of the United States, is—

The herein-described snap consisting of two pivotal jaws having communicating recesses of some depth in their upper ends, annular recesses in their meeting faces at right angles to and communicating with those in the ends, and lugs standing centrally within the last-named recesses and of a size to pass through the eye of a smoke-bell and contact with each other to prevent both a forward and rotary movement of the bell, a handle, arms connected to the jaws below their pivots, a collar sliding on the handle, connections between the collar and the ends of the arms, for operating the jaws and a coiled spring normally holding the jaws closed to clamp only the thickened base of the bell in such a manner that the entire body portion proper stands exposed and out of contact with the clamp, substantially as and for the purpose set forth.

Signed by me at New York, N. Y., this 30th day of April, 1898.

PETER SHAW.

Witnesses:
H. L. STEGMAN,
E. F. GENNERT.